UNITED STATES PATENT OFFICE 2,089,633

POLYMETHINE DYESTUFFS

Paul Wolff and Gustav Schäfer, Frankfort-on-the-Main, Germany, assignors to General Aniline Works, Inc., New York, N. Y., a corporation of Delaware No Drawing. Application January 20, 1936, Serial No. 59,996. In Germany January 25, 1935

6 Claims. (Cl. 260—38)

The present invention relates to polymethine-dyestuffs.

We have found that acid polymethine-dyestuffs, which are distinguished by a very good fastness to light and by clear shades, may be obtained by condensing a sulfonic acid of a hydrogenated heterocyclic nitrogen compound, such as, for instance, a dihydro-alpha-phenylindole, with an indoline compound containing in alpha-position to the nitrogen a reactive methylene-group, one hydrogen atom of which is replaced by the aldehyde-group; or by sulfonating the basic dyestuffs which are obtainable by condensing the aldehydo-compound with a hydrogenated heterocyclic nitrogen compound, or by simultaneously condensing and sulfonating both components in sulfuric acid.

The dyestuffs thus obtainable are new; there are obtained, for instance, the dyestuffs of the following general formula:

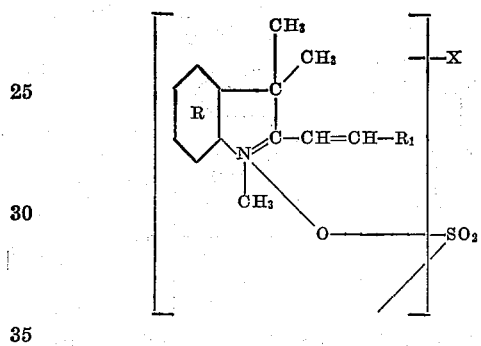

wherein the benzene nucleus R may contain substituents or may be condensed with a further benzene nucleus to form a naphthalene nucleus, wherein $R_1$ means the radical of a hydrogenated heterocyclic compound of the group consisting of dihydroindoles and tetrahydroquinolines bound by its nitrogen atom to the =CH-group of the above formula and X means that the compounds may contain further sulfonic acid groups, and wherein the free bond of the $SO_2$-group is attached to an aromatic nucleus of the molecule; and the salts of these compounds.

The following examples serve to illustrate the invention, but they are not intended to limit it thereto; the parts are by weight:

(1) 8.5 parts of 1.3.3-trimethylindoline-2-methylene-omega-aldehyde and 18.7 parts of the sodium salt of dihydro-2-phenylindole-disulfonic acid (obtainable by sulfonating dihydro-2-phenylindole in fuming sulfuric acid containing 20 per cent. of sulfuric anhydride) are dissolved in 216 parts of sulfuric acid of 22 per cent. strength, and the whole is stirred for 8 hours at room temperature. The dyestuff which has separated in a powdery form is isolated and transformed by means of sodium carbonate into its sodium salt. It dyes wool very clear yellow tints of a very good fastness to light.

The dyestuff probably corresponds to the following formula:

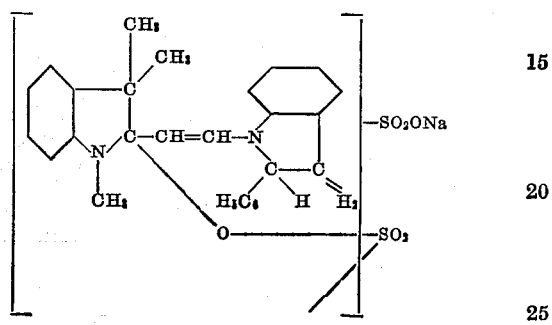

(2) 12 parts of 1.3.3-trimethylinodline-2-methylene-omega-aldehyde and 12 parts of dihydro-2-phenylindole are introduced at room temperature into 100 parts of fuming sulfuric acid containing 20 per cent. of sulfuric anhydride, and the whole is stirred for about 10 hours. The mass is then poured on ice and the dyestuff, probably a trisulfonic acid is transformed in the usual manner into its sodium salt. It dyes wool yellow tints of the same clearness and properties of fastness as those of the dyestuff described in Example 1.

(3) 10 parts of the basic dyestuff, which is obtainable by condensing 1.3.3-trimethyl-5-methoxyindoline-2-methylene-omega-aldehyde with tetrahydroquinoline (cf., for instance, the process described in U. S. specification Serial No. 756,893, filed December 10, 1934, in the name of Paul Wolff), are sulfonated in 50 parts of sulfuric acid monohydrate for about 1 hour at 65° C. The mass is poured on ice and the dyestuff, probably a disulfonic acid, is then isolated in the form of its sodium salt. It dyes wool vivid yellow tints of very good fastness to light.

(4) 10 parts of the basic dyestuff, which is obtainable by condensing 1.3.3-trimethyl-5-phenylindoline-2-methylene-omega-aldehyde with dihydro-2-phenylindole (cf., for instance, the process described in the aforesaid U. S. specification), are sulfonated in 50 parts of sulfuric acid monohydrate in the course of 4 hours at 75° C. A dyestuff, probably a trisulfonic acid, is thus obtained which, in the form of its sodium salt, dyes wool clear yellow tints of very good fastness to light.

(5) 10 parts of the basic dyestuff, which is obtainable by condensing 1.3.3-trimethyl-4.5-benzoindoline-2-methylene-omega-aldehyde with dihydro-2-methylindole, are sulfonated at room temperature in fuming sulfuric acid containing 20 per cent. of sulfuric anhydride; the acid dyestuff thus formed, probably a trisulfonic acid, is isolated in the usual manner.

(6) 10 parts of the basic dyestuff, which is obtainable by condensing 1.3.3-trimethylindoline-2-methylene-omega-aldehyde with dihydro-2.5-dimethylindole, are sulfonated at 70° C. in sulfuric acid monohydrate. The dyestuff formed, probably a disulfonic acid, dyes wool brilliant greenish-yellow tints.

(7) 10 parts of the basic dyestuff, which is obtainable by condensing 1.3.3-trimethylindoline-2-methylene-omega-aldehyde with dihydro-2-methyl-5-methoxyindole, are sulfonated with sulfuric acid monohydrate. The dyestuff formed has properties similar to those of the dyestuff described in Example 6.

(8) 10 parts of the basic dyestuff which is obtainable by condensing 1.3.3-trimethyl-5-methoxyindoline-2-methylene-omega-aldehyde with dihydro-2.4.6-trimethylindole, are sulfonated in fuming sulfuric acid containing 10 per cent. of sulfuric anhydride. The acid dyestuff is isolated. It dyes wool tints somewhat more reddish than those of the dyestuff described in Example 6.

(9) 10 parts of 1.3.3-trimethylindoline-2-methylene-omega-aldehyde are condensed with 10.6 parts of dihydro-2-methylindosulfonic acid in the presence of an acid condensing agent. The dyestuff obtained which probably has the following constitution:

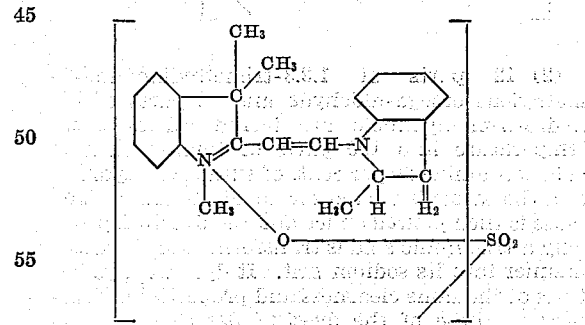

dyes wool very clear greenish-yellow tints. Further sulfo-groups may be introduced by sulfonation.

(10) 12 parts of sodium 1.3.3-trimethylindoline-2-methylene-omega-aldehyde-sulfonate are condensed with 6 parts of dihydro-2-methylindole. The dyestuff obtained has properties similar to those of the dyestuff described in Example 9. Further sulfo-groups may be introduced by sulfonation.

(11) 10 parts of the basic dyestuff, which is obtainable by condensing 1.3.3-trimethylindoline-2-methylene-omega-aldehyde with dihydro-2-methylindole, are sulfonated at about 50° C. in sulfuric acid monohydrate. The dyestuff formed, probably a disulfonic acid, has very good properties of fastness. It corresponds probably to the following formula:

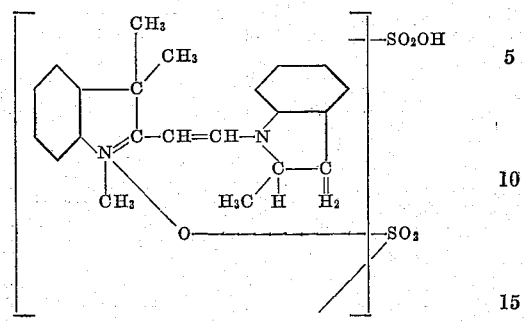

We claim:
1. The compounds of the general formula:

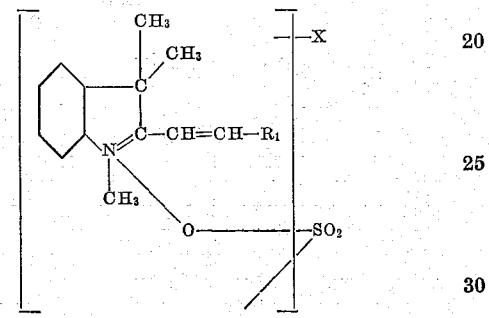

wherein $R_1$ means the radical of a hydrogenated heterocyclic compound of the group consisting of dihydroindoles and tetrahydroquinolines bound by its nitrogen atom to the =CH-group of the above formula and X means a member of the group consisting of hydrogen and sulfonic acid group and wherein the free bond of the $SO_2$-group is attached to an aromatic nucleus of the molecule.

2. The compounds of the general formula:

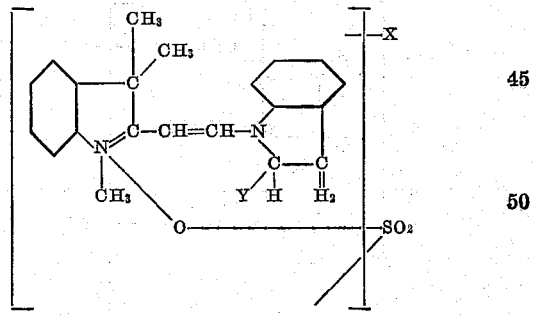

wherein Y means a member of the group consisting of methyl and phenyl and X means a member of the group consisting of hydrogen and sulfonic acid group and wherein the free bond of the $SO_2$-group is attached to an aromatic nucleus of the molecule.

3. The compound of the formula:

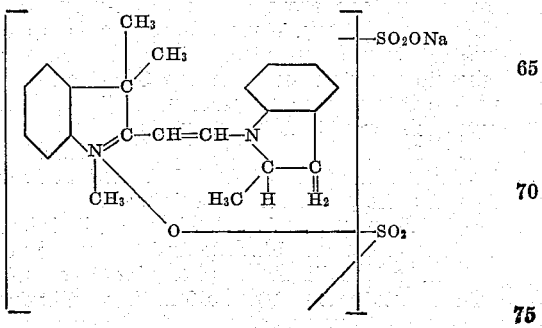

being a dyestuff with very good properties of fastness.

4. The compound of the formula:

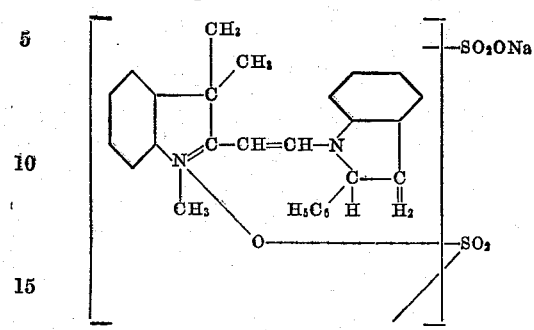

dyeing wool very clear yellow tints of very good fastness to light.

5. The compound of the formula:

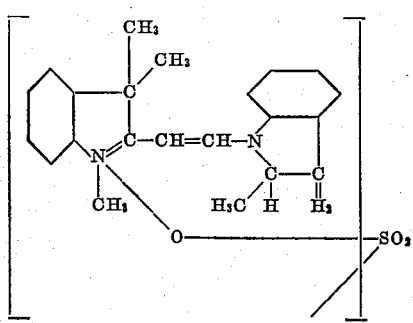

dyeing wool very clear greenish-yellow tints.

6. The compounds of the general formula:

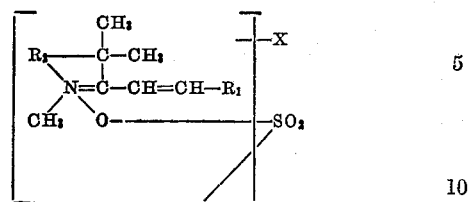

wherein $R_1$ means the radical of a hydrogenated heterocyclic compound of the group consisting of dihydroindoles and tetrahydroquinolines bound by its nitrogen atom to the =CH-group of the above formula, $R_2$ means an aromatic radical of the group consisting of phenylene, methoxy-phenylene, phenyl-phenylene and naphthylene and X means a member of the group consisting of hydrogen and sulfonic acid group, and wherein the free bond of the $SO_2$-group is attached to an aromatic nucleus of the molecule.

PAUL WOLFF.
GUSTAV SCHÄFER.